(12) United States Patent
Englund et al.

(10) Patent No.: US 6,940,601 B2
(45) Date of Patent: Sep. 6, 2005

(54) METHOD AND APPARATUS FOR ESTIMATING CHROMATIC DISPERSION IN FIBRE BRAGG GRATINGS

(75) Inventors: Mark Andrew Englund, Fairview Park (AU); Eric Carl Magi, Cremorne (AU)

(73) Assignee: Defence Science and Technology Organisation, Salisbury (AU)

( * ) Notice: Subject to any disclaimer, the term of this patent is extended or adjusted under 35 U.S.C. 154(b) by 177 days.

(21) Appl. No.: 10/239,466

(22) PCT Filed: Mar. 23, 2001

(86) PCT No.: PCT/AU01/00330

§ 371 (c)(1),
(2), (4) Date: Mar. 18, 2003

(87) PCT Pub. No.: WO01/71398

PCT Pub. Date: Sep. 27, 2001

(65) Prior Publication Data

US 2003/0156296 A1 Aug. 21, 2003

(30) Foreign Application Priority Data

Mar. 23, 2000 (AU) .............................. PQ6415

(51) Int. Cl.$^7$ ................................. G01B 9/02
(52) U.S. Cl. ................. 356/477; 356/517; 356/73.1
(58) Field of Search .............. 356/477, 73.1, 356/517, 450

(56) References Cited

U.S. PATENT DOCUMENTS

| | | | |
|---|---|---|---|
| 6,229,606 B1 | 5/2001 | Way et al. | ........... 356/364 |
| 6,313,934 B1 | 11/2001 | Fortenberry | |
| 6,407,805 B1 | 6/2002 | Sorin | |
| 6,486,961 B1 * | 11/2002 | Szfraniec et al. | ........... 356/477 |
| 2002/0113972 A1 | 8/2002 | Rosenfeldt et al. | |

FOREIGN PATENT DOCUMENTS

| | | |
|---|---|---|
| WO | 9714226 | 4/1997 |
| WO | 9825105 | 6/1998 |

OTHER PUBLICATIONS

Simova, E. et al. "Spectral Characterization and Chromatic Dispersion Measurements in Fiber Bragg Gratings for Dispersion Compensation." IEEE Instrumentation and Measurement Technology Conference, St. Paul, MN, USA. May 18–21, 1998. pp. 712–715.

Bochove, E.J. et al. "FM–AM conversion by material dispersion in an optical fiber." Optic Letters, Feb. 1981, 6(2): pp. 58–60.

"Definition and Test Methods for the Relevant parameters of single–mode fibres." International Telecommunications Union, Apr. 1997, vol. Itu–T, no. G650, pp. 41–50.

Yoshida, M. et al. "Effect of group velocity dispersion of optical fiber on optical frequency domain reflectometry." Summaries of Papers Presented at the Conference on Lasers and Electro–Optics. CLEO 99. Technical Digest, Postconference Edition. Baltimore, MD. May 23–28, 1999, pp. 388–389.

\* cited by examiner

Primary Examiner—Andrew H. Lee
(74) Attorney, Agent, or Firm—Ladas & Parry LLP

(57) ABSTRACT

The present invention provides a method and apparatus for obtaining a measure of the chromatic dispersion of a fibre bragg grating, the method comprising: disposing the grating in a reflection arm of an interferometer; inputting probe laser light into the interferometer; stepping the wavelength of the light across the reflection bandwidth of the grating, while at each step modulating the wavelength by a wavelength modulation less than the size of the respective step, and thereby producing a resulting phase modulation; and demodulating the phase modulation and determining therefrom a measure of the chromatic dispersion.

14 Claims, 3 Drawing Sheets

METHOD AND APPARATUS FOR ESTIMATING CHROMATIC DISPERSION IN FIBRE BRAGG GRATINGS

FIELD OF THE INVENTION

The present invention relates to a method and apparatus for estimating chromatic dispersion in fibre Bragg gratings.

BACKGROUND OF THE INVENTION

The technology of intra-core fibre Bragg gratings has spawned many new devices that have found applications in the telecommunication and optical sensing industries. These gratings are used to perform filter functions in the optical domain that are simply not possible (or cost-effective) in the electronic domain. Fibre Bragg gratings are playing an important role in the optical communication technology of wave division multiplexing. In one particular example, the application of chirped fibre Bragg gratings to chromatic dispersion compensation has become an important consideration in optical links as the data rates increase to meet market demands. Further, chromatic dispersion compensators based on fibre gratings are now commercially available. Accordingly, the fabrication and characterisation of fibre Bragg gratings has become of significant importance in the optical telecommunication market.

Fibre Bragg gratings have very similar characteristics to classical free space diffraction gratings where, for a nominal angle of incidence, the reflectivity is primarily a function of the incident wavelength. Fibre Bragg gratings can thus be considered a subset of the free-space diffraction gratings. The distinction, however, is that the angle of incidence in fibre gratings is fixed to being perpendicular to the grating length (assuming the grating cross-section is perpendicular to the fibre waveguide). The Bragg condition is satisfied when the partial reflectors that make up the grating contribute a reflected component of the incident electric field in phase with all the other partial reflectors in the grating. Accordingly, the Bragg wavelength is expressed as:

$$\lambda_B = 2\bar{n}\Lambda, \quad (1)$$

where $\lambda_B$ is the Bragg wavelength (m), $\bar{n}$ is the average refractive index, and $\Lambda$ is the pitch of the grating (m).

As the wavelength is de-tuned away from the Bragg condition, the phase synchronicity between the ensemble of reflections rapidly deteriorates and the constructive interference ceases. In other words, the resonance condition rapidly ceases with increasing distance either side of the Bragg wavelength. A typical grating spectral response yields an extremely narrow band of wavelengths where the resonant reflection exists, so they represent a nearly ideal band-pass or notch filter in the optical domain.

An existing Michelson interferometer relevant to the present invention is shown schematically in FIG. 1. The interferometer has two arms of different lengths, of path imbalance ΔL. In this Michelson interferometer, laser light is input along fibre 10 and transmitted to a beam splitter in the form of coupler 12, where the light is split along arms 14 and 16 of length, respectively, L and L+ΔL. Light is reflected by respective mirrors 18 and 20, and transmitted back to coupler 12. The light—in fact as interference fringes—is then observed by means of a photodiode 24 located at the exit of output fibre 22.

In uniform fibre Bragg gratings the spacing between successive partial reflectors is fixed throughout the grating. However, it is possible to fabricate fibre Bragg gratings in which the spacing is not fixed. This is the case in, for example, with linearly chirped fibre Bragg gratings, in which the spacing between successive partial reflectors changes at a constant rate over the length of the grating. Chirped and other non-uniformly spaced gratings have a number of interesting properties and advantages. For example, the linear chromatic dispersion of single mode optical fibre has become one of the limiting factors in exploiting the intrinsically large bandwidth that optical fibre communications offer. Chromatic dispersion is a result of both material and waveguide dispersion, which are in turn a function of the wavelength dependence of the effective refractive index and the profile of the core's refractive index respectively. The effect of chromatic dispersion may be illustrated with a transmitted optical pulse containing a finite band of wavelengths. As this pulse propagates through the optical fibre, the chromatic dispersion effectively advances the longer wavelength constituents and retards the shorter wavelengths. This induces the edges of the pulse to dilate in time which, in the context of a communication bit stream, may interfere with the adjacent bit cell. A typical figure for the dispersion in communication grade fibre is approximately $-16$ ps.nm$^{-1}$.km$^{-1}$.

Chirped fibre Bragg gratings can be designed to exhibit high degrees of linear chromatic dispersion. With a linear chirp in the pitch across a grating, the apparent reflection point varies linearly with wavelength. Thus, for a pulse that has been dilated through chromatic dispersion in optical fibre, it is possible to recompress the pulse by reflecting it off a correctly orientated Chirped fibre Bragg grating. It is possible to achieve 1000 ps.nm$^{-1}$ of chromatic dispersion in a grating of a length 10 cm. Thus, it is possible to compensate optical fibre dispersion that occurred over many hundreds of kilometres using a very short low loss device.

As a consequence of the non-uniform spacing, the Bragg condition varies as a function of the spatial position within the grating. Also, whereas in a uniform grating the effective reflection point from within the grating is approximately constant with small detunings, small wavelength detunings in chirped gratings induce a movement in the Bragg resonance, the result of which is a change in the apparent reflection point from within the grating. Consequently, such gratings have found a number of important applications, so it has become important to be able to characterize accurately the properties, such as chromatic dispersion, of such gratings.

SUMMARY OF THE INVENTION

According to the present invention, therefore, there is provided a method of obtaining a measure of the chromatic dispersion of a fibre bragg grating, including:

disposing said grating in a reflection arm of an interferometer;

inputting probe laser light into said interferometer;

stepping the wavelength of said light across the reflection bandwidth of said grating, while at each step modulating said wavelength by a wavelength modulation less than the size of said respective step, and thereby producing a resulting phase modulation; and demodulating said phase modulation and determining therefrom a measure of said chromatic dispersion.

Thus, with the use of successive, slightly different wavelengths, the movement in the Bragg condition can be observed as a change in the time of flight of the reflected light. This provides a measure of or, if desired, values for the actual chromatic dispersion. In other words, the stepping of the tunable laser in centre wavelength, with—at each step—the output from the tunable laser is slightly frequency modulated, leads to an interference pattern at the photo-detector having a time dependence that is related to the rate of the slight frequency modulation applied to the laser. The phase amplitude of the demodulated interference pattern has information regarding the time of flight experienced by the probe laser light.

It should also be noted that references to "laser light" are intended to refer to laser output of any wavelength (whether visible, infra-red, ultraviolet, etc) that is suitable for use in the method or apparatus of the present invention.

Preferably said laser light is in the form of a continuous beam.

Preferably said measure of said chromatic dispersion comprises a time delay as a function of probe wavelength.

Preferably said wavelength modulation is much less than said size of said respective step.

Preferably said method includes normalising the response of said interferometer by means of a Mach Zehnder interferometer.

Preferably said demodulating is by means of a passive homodyne demodulation technique.

The present invention also provides an apparatus for obtaining a measure of the chromatic dispersion of a fibre bragg grating, including:

an interference means optically connectable to said fibre bragg grating to form an interferometer;

tunable laser source means for providing wavelength tunable laser light so that the wavelength of said tunable laser source can be stepped across the reflection bandwidth of said grating;

modulation means for modulating said wavelength of said light by an amount less than said steps;

a photo-detector for detecting light from said interferometer and producing a signal indicative thereof;

demodulation means for demodulating said signal; and computation means for determining a measure of said chromatic dispersion from said demodulated signal.

Preferably said laser light is in the form of a continuous beam.

Preferably said measure of said chromatic dispersion comprises a time delay as a function of probe wavelength.

Preferably said apparatus includes stepping means for stepping said tunable laser source across the reflection bandwidth of said grating.

Preferably said wavelength modulation is much less than said size of said respective step.

Preferably said apparatus includes a Mach Zehnder interferometer for normalising the response of said interferometer.

Preferably said demodulation means employs a passive homodyne demodulation technique.

BRIEF DESCRIPTION OF THE DRAWINGS

In order that the present invention may be more clearly ascertained, preferred embodiments will now be described, by way of example, with reference to the accompanying drawings, in which.

DETAILED DESCRIPTION

The optical phase delay through a length of optical fibre can be written as:

$$\phi = knL \tag{2}$$

where $\phi$ the optical phase delay (rad), k the optical wave number in vacuum (rad.m$^{-1}$)

n the refractive index, and

L the length of fibre (m).

Thus there are several physical parameters that determine the phase delay in a length of optical fibre. In the present context, the relevant variable is wavelength, which is implicit in k, the wave number.

To obtain an expression describing the phase sensitivity to wavelength change, Eq (2) is differentiated with respect to wavelength to give:

$$\frac{\partial \phi}{\partial \lambda} = -\frac{2\pi n L}{\lambda^2} \tag{3}$$

where $\phi$ the optical phase delay (rad), $\lambda$ the optical wavelength (m), n the refractive index, and L the length of fibre (m).

Eq (3) describes the relationship between phase delay and wavelength for a given length of fibre. Using the prior art Michelson interferometer depicted in FIG. 1, it is straightforward to observe that the relative phase change as a result of wavelength change can be written in the same form as Eq (3), but with $\Delta L$ in place of L:

$$\frac{\partial \phi}{\partial \lambda} = -\frac{2\pi n \Delta L}{\lambda^2}. \tag{4}$$

Figure 1:
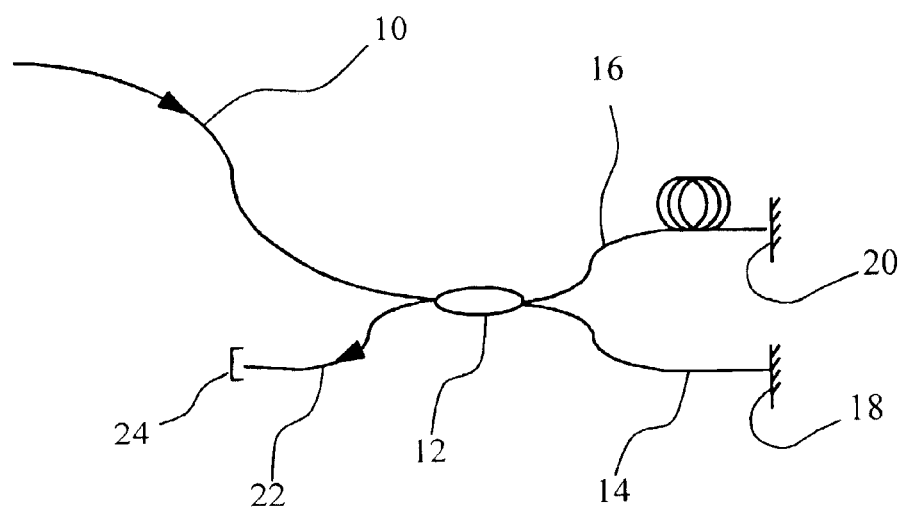
FIG. 1 is a schematic view of a prior art Michelson interferometer with a path imbalance of $\Delta L$.

The intensity at the output of the two beam Michelson interferometer shown in FIG. 1 is a function of the optical phase relationship between the arms 14 and 16 of the interferometer according to $$I(t) = A + V E_1 E_2 \cos(\phi(t) + \theta) \tag{5}$$

where

I(t) is the intensity of the light at the face of the photodiode (W), $\phi(t)$ is the optical phase difference between the arms 14 and 16 of the interferometer (rad), $\theta$ is the phase bias of the interferometer arms (rad), A is a constant term proportional to the input optical power, V is a factor describing both the polarisation and coherence relationships between the two arms 14 and 16 of the interferometer, $E_1$ is the electric field amplitude in the first arm 14 of the interferometer (N.C$^{-1}$), and $E_2$ is the electric field amplitude in the second arm 16 of the interferometer (N.C$^{-1}$).

From the terms in Eqs (4) and (5), the relationship between the interferometer's path imbalance and the intensity output, $$\Delta L \propto |\phi(t)| \propto I(t) \qquad (6)$$

where $\Delta L$ is the interferometer path imbalance (m), $|\phi(t)|$ is the demodulated peak to peak phase amplitude (rad), and $I(t)$ is the interferometer output intensity (W).

Thus for a known wavelength modulation, $\alpha\lambda$, it is possible to demodulate the intensity change to obtain the amplitude of the phase excursion using Eq (5). The path imbalance of the interferometer can then be deduced using Eq (4).

Figure 2:
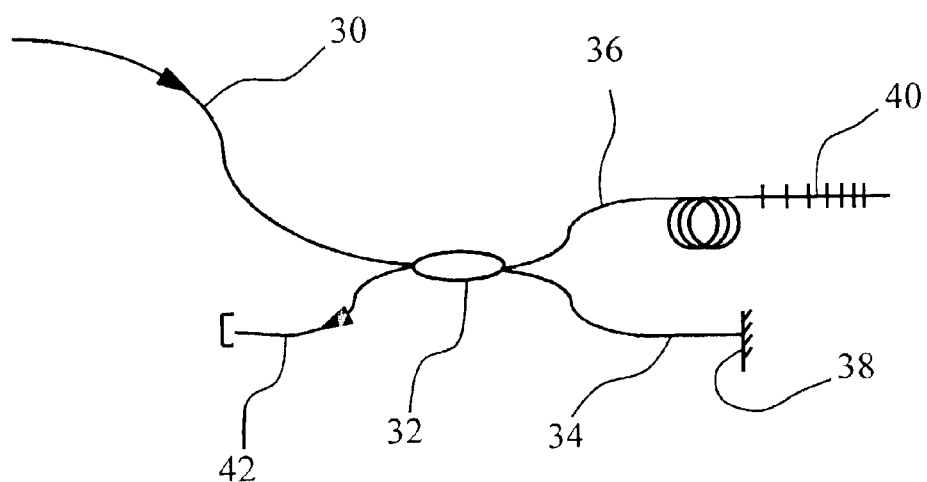
FIG. 2 is a schematic view of a simplified dispersion measurement apparatus according to one embodiment of the present.

A dispersion measurement apparatus according to one embodiment of the present invention is shown schematically in FIG. 2. This apparatus includes an interferometer that is similar to the prior art interferometer shown in FIG. 1, but with one of the mirrors of the prior art device replaced with a chirped fibre Bragg grating. Thus, the interferometer of the apparatus shown in FIG. 2 includes input fibre 30, coupler 32, first reflection arm 34 (of length L), second reflection arm 36 (of length L+$\Delta L$, where $\Delta L$ depends on the wavelength dependent location of the reflection point within arm 36), mirror 38, chirped fibre Bragg grating 40 and output fibre 42. A probe laser beam (of wavelength $\lambda_p + \Delta\lambda_m \sin(\omega t)$) entering input fibre 30 and transmitted thereby to coupler 32, is directed along arms 34 and 36, and reflected from mirror 38 and chirped fibre Bragg grating 40 respectively. It should be recalled that the reflection point from within a chirped grating varies depending on the probe wavelength; consequently, the path imbalance of the hybrid interferometer of FIG. 2 will yield information about the position of the reflection point from within the grating 40.

Since the chromatic dispersion of the chirped fibre Bragg grating 40 is the group delay measured as a function of wavelength, and the group delay is essentially the time of flight of power through the fibre, it is possible to define $$G(\lambda_p) = k.\Delta L(\lambda_p), \qquad (7)$$

where $G(\lambda_p)$ is the Group Delay at probe wavelength $\lambda_p$ (ps), $\Delta L(\lambda_p)$ is the path imbalance at probe wavelength $\lambda_p$ (m), and k is a constant accounting for the conversion of the path length to a time of flight, and the offset path imbalance of the interferometer.

It is therefore possible to characterise the Group Delay characteristics of a grating 40 with the apparatus depicted in FIG. 2 by stepping the probe wavelength across the reflection band width of the grating 40, while at each step modulating the probe wavelength by $\Delta\lambda_m$. It should be noted that $\Delta\lambda_m <<$ (step size of $\lambda_p$). Demodulating the resulting phase modulation yields a time delay as a function of probe wavelength, that is, the chromatic dispersion characteristic of the grating 40.

Figure 3:
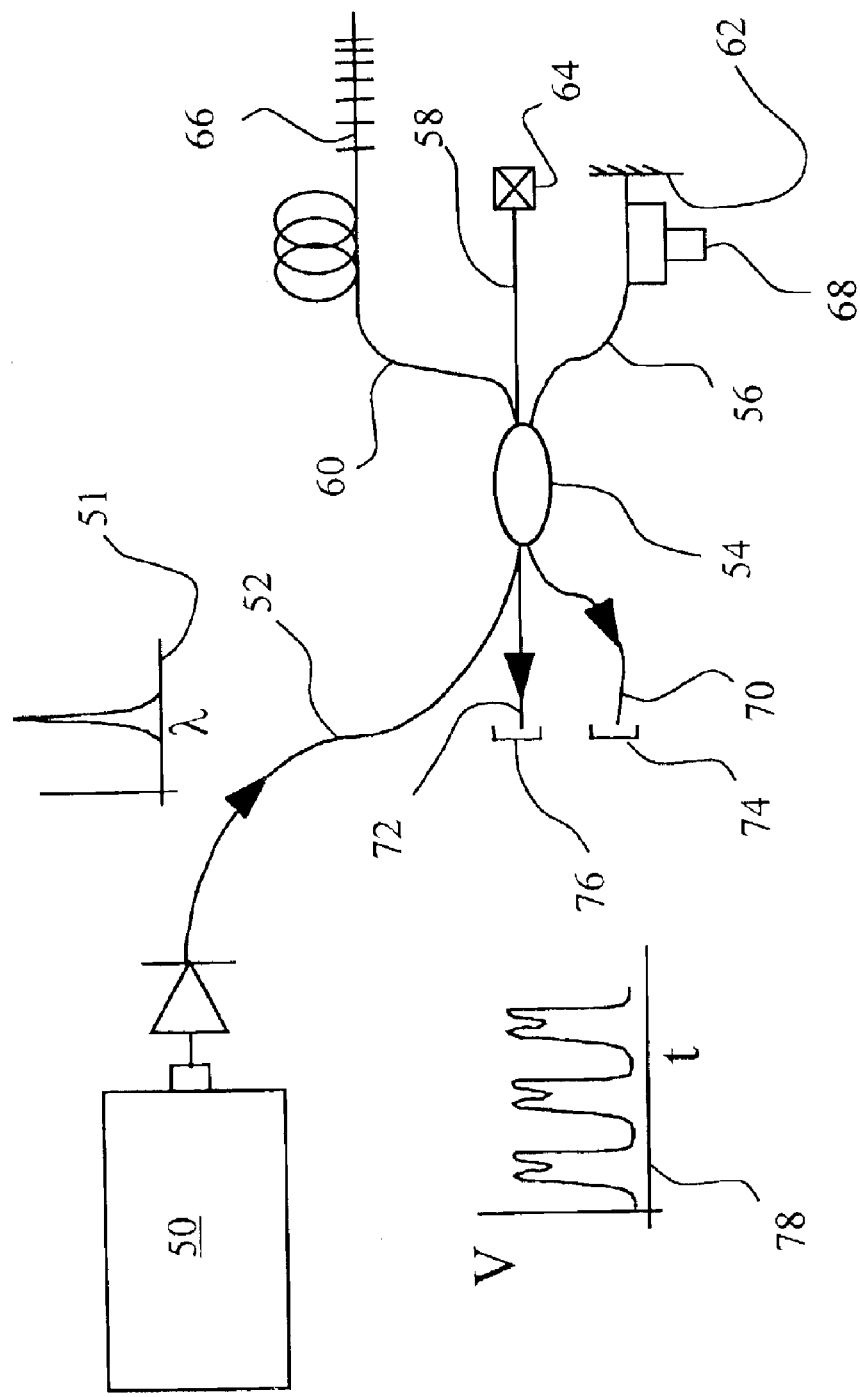
FIG. 3 is a schematic view of a dispersion measurement apparatus according to a further embodiment of the present invention.

A dispersion measurement apparatus according to a further embodiment of the present invention, again including an interferometer, is shown schematically in FIG. 3. The interferometer is essentially a Michelson configuration. The apparatus includes a tunable laser source 50, an input fibre 52 and a 3×3 coupler 54. The beam (the wavelength profile of which is depicted schematically at 51) from laser source 50 is directed along input fibre 52 to coupler 54, which splits them three ways along reflection arms 56, 58 and 60. However, the interferometer is essentially a two-beam interferometer since one of the second reflection arm 58 is terminated by means of mandrel 64, so does not contribute a reflection to the output of the interferometer. Light directed along first reflection or reference arm 56 is reflected by mirror 62, while that directed along third reflection arm 60 is reflected by chirped fibre Bragg grating 66.

The 3×3 coupler 54 is used due to the particular demodulation technique employed, that is, passive homodyne. This technique requires that the phase relationship between the two outputs be other than $\pi$ radians (as is the case with 2×2 terminated interferometers). This requirement is satisfied with the 3×3 coupler, which has a characteristic coupler angle of approximately $2\pi/3$ radians.

The tunable laser source 50 provides both the discrete wavelength steps and the small amplitude wavelength modulation of the beam. A polarisation controller 68 is included in the reference arm 56 of the measurement interferometer to optimise the visibility of the interference pattern and improve the resolution of the measurement. Preferably extra isolation is provided on the output of the tunable laser source 50 so that the wavelength modulation is not perturbed by feedback. It is also preferable that the reflectivity of the mirror 62 match the peak reflectivity of the grating 66, but this is not critical.

Light beams returned by the mirror 62 and grating 66 interfere within coupler 54, and then detected at the exits of output fibres 70 and 72 by means of photodiodes 74 and 76 respectively. In use, the wavelength of the probe beam 51 is stepped across the reflection bandwidth of grating 66, while at each step the wavelength is modulated—as discussed above—by an amount much less than the step size. The resulting phase modulation is measured by means of photodiodes 74 and 76, and the time delay as a function of probe wavelength is calculated. This time delay is essentially the chromatic dispersion of grating 66.

Figure 4:
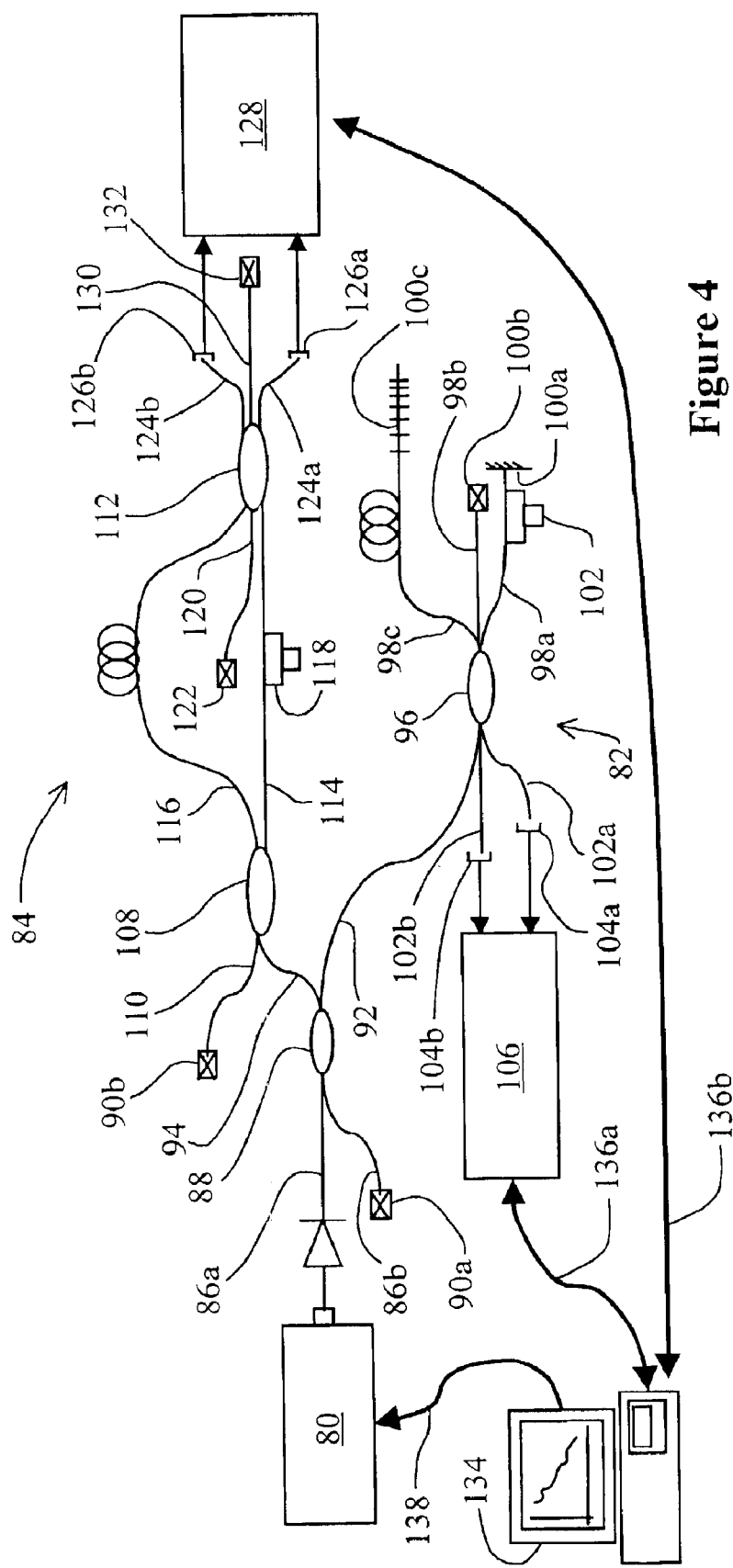
FIG. 4 is a schematic view of a dispersion measurement apparatus according to a still further embodiment of the present invention.

A dispersion measurement apparatus according to another embodiment of the present invention is shown schematically in FIG. 4. The apparatus includes a tunable laser source 80 and a Michelson interferometer 82, as well as a Mach Zehnder interferometer 84 to normalise the response of the Michelson interferometer 82 to undesirable variations in wavelength modulation from the tunable laser source 80. This apparatus also has a degree of desensitisation to acoustically induced phase noise and thermal drift, owing to the close proximity of the two interferometers.

To further reduce the effect of external thermal and acoustic noise sources both interferometers 82 and 84 are enclosed in a thermally isolated anechoic chamber (not shown).

The probe beam from tunable laser source 80 are directed along input fibre 86a to first 2×2 coupler 88. The other input arm 86b of 2×2 coupler 88 is terminated by means of mandrel 90a.

First 2×2 coupler 88 splits the beam along arms 92 and 94 to the Michelson interferometer 82 and the Mach Zehnder interferometer 84 respectively.

The Michelson interferometer 82 is essentially identical to that shown in FIG. 3, including input arm 92 and first 3×3 coupler 96. The latter directs the laser beam along reflection arms 98a,b,c to, respectively, mirror 100a, mandrel terminator 100b and chirped fibre Bragg grating 100c. First reflection or reference arm 98a is also provided with a polarisation controller 102. The laser beams reflected by mirror 100a and grating 100c interfere in first 3×3 coupler 96, and—after passing along output fibres 102a,b—are detected by photo-detectors 104a,b. The outputs of the photo-detectors 104a,b are then converted to digital form by analogue to digital converter and associated electronics 106.

Mach Zehnder interferometer 84 includes an input fibre (in the form of arm 94 of 2×2 coupler 88) and a beam splitter in the form of 2×2 coupler 108. (Arm 110 of 2×2 coupler 108 is terminated by mandrel 90b.) Light beams from 2×2 coupler 108 are transmitted to a 3×3 coupler 112 along shorter and longer arms 114 and 116, the former including polarisation controller 118. The third input arm 120 of 3×3 coupler 112 is terminated by means of mandrel 122.

Output beams from 3×3 coupler 112 are directed along first and second output arms 124a and 124b and are detected by photo-detectors 126a,b respectively. The outputs of the photo-detectors 126a,b are then converted to digital form by analogue to digital converter and associated electronics 128. The third output arm 130 of 3×3 coupler 112 is terminated by means of mandrel 132.

Further to the comment above concerning undesirable variations in wavelength modulation, tunable laser sources of this type may suffer from large changes in the wavelength amplitude (cf. the size of the probe wavelength modulation $\Delta\lambda_m$ in the apparatus of FIG. 2) for the same drive voltage applied when the centre wavelength was discretely changed (cf. the step change in $\Delta\lambda_m$ in the apparatus of FIG. 2). Given that the path imbalance of the Michelson interferometer 82 will change when the wavelength of the tunable laser source 80 is stepped, the path imbalance bias and the amplitude of $\Delta\lambda_m$ (cf. FIG. 2) are chosen such that the minimum phase amplitude that results during the measurement is >2π rad, so that during the demodulation process an accurate estimate of the DC point of the intensity pattern can be determined (i.e. the path imbalance of the interferometer 82 assuming that the reflection point is centred in the grating). Thus it is possible to have a long length of fibre in one arm of the interferometer to ensure that the wavelength sensitivity (the phase excursion) is large.

Spare leads 86b, 98b, 110, and 120 and 130 of couplers 88, 96, 108 and 112 respectively are terminated with mandrel terminators 90a, 100b, 90b, and 122 and 132 respectively, to minimise unwanted reflections from propagating around the optical circuit of FIG. 4. It is also preferable to use only Angled Polished Connectors.

The sequence of measurement is as follows.

The tunable laser source 80 is instructed to step incrementally across the reflection spectrum of grating 100c. At each wavelength step, the frequency of the laser source 80 is modulated to induce a particular intensity pattern that is proportional to the group delay. The intensity outputs from interferometers 82 and 84 are sampled at photo-detectors 104a,b and 126a,b using analog-to-digital converters 106 and 128. This information is then written to the hard drive of the measurement PC 134, which is connected to analog-to-digital converters 106 and 128 by data links 136a,b respectively. (These links also allow the remote control of analog-to-digital converters 106 and 128, as does data link 138 of laser source 80.) The stored intensity patterns are then demodulated electronically. The response of the Michelson interferometer 82 (with the device under test) is then divided by the response of the Mach Zehnder interferometer 84. The resulting peak to peak phase amplitude measurements represent the mean reflection point for that particular wavelength step, that is, the average of the ensemble of reflection points for the bandwidth of wavelength modulation applied. Thus it is preferable for measurement accuracy that the wavelength modulation amplitude be very much smaller than the measurement step size. This process is then repeated for all wavelength steps, so that an array of phase amplitude measurements result that can be demodulated to yield the group delay curve of grating 100c.

Thus, the measurement can be automated to minimise measurement time and to improve accuracy. The small measurement time also provides further discrimination against thermal phase drift.

It should be noted that while the discussion of this technique has focussed on the characterisation of chirped fibre Bragg gratings it is equally applicable to characterising the group delay characteristics of other fibre Bragg grating types.

Alternative High Resolution Wave-Division-Multiplexed Setup

To compensate directly for noise sources in the Michelson interferometer, it is also possible to have two wavelengths operating in the Michelson interferometer using wave division multiplexing. The first wavelength has both the fibre Bragg grating related dispersion measurand and the noise sources of the interferometer. The second wavelength facilitates a measure (without interaction with the fibre Bragg grating under test) of just the interferometer's noise sources that can be normalised from the original measurement wavelength channel, to yield a highly accurate measurement of the chromatic dispersion of the grating. It is also possible to dispense with the second Mach Zehnder interferometer in FIG. 4, if the tunable laser source can be divided to form the two Wave-Division-Multiplexed (WDM) channels: one at the original wavelength from the tunable laser source and consistent with wavelength of the grating, the other frequency shifted beyond the highest frequency response of the photo-detectors. This would facilitate the removal of both the tunable laser source variations and the thermally and acoustically induced phase noise in the measurement through normalising the measurement WDM channel by the reference WDM channel.

Modifications within the spirit and scope of the invention may readily be effected by persons skilled in the art. It is to be understood, therefore, that this invention is not limited to the particular embodiments described by way of example hereinabove.

The claims defining the invention are as follows:

1. A method of obtaining a measure of the chromatic dispersion of a fibre bragg grating, comprising:
    disposing said grating in a reflection arm of an interferometer;
    inputting probe laser light into said interferometer;
    stepping the wavelength of said light across the reflection bandwidth of said grating, while at each step modulating said wavelength by a wavelength modulation less than the size of said respective step, and thereby producing a resulting phase modulation; and
    demodulating said phase modulation and determining therefrom a measure of said chromatic dispersion.

2. A method as claimed in claim 1, wherein said laser light is in the form of a continuous beam.

3. A method as claimed in claim 1, wherein said measure of said chromatic dispersion comprises a time delay as a function of probe wavelength.

4. A method as claimed in claim 1, wherein said wavelength modulation is much less than said size of said respective step.

5. A method as claimed in claim 1, including normalising the response of said interferometer by means of a Mach Zehnder interferometer.

6. A method as claimed in claim 1, wherein said demodulating is by means of a passive homodyne demodulation technique.

7. An apparatus for obtaining a measure of the chromatic dispersion of a fibre bragg grating, having:
- an interference means optically connectable to said fibre bragg grating to form an interferometer;
- tunable laser source means for providing wavelength tunable laser light so that the wavelength of said tunable laser source can be stepped across the reflection bandwidth of said grating;
- modulation means for modulating said wavelength of said light by an amount less than said steps;
- a photo-detector for detecting light from said interferometer and producing a signal indicative thereof;
- demodulation means for demodulating said signal; and
- computation means for determining a measure of said chromatic dispersion from said demodulated signal.

8. An apparatus as claimed in claim 7, wherein said laser light is in the form of a continuous beam.

9. An apparatus as claimed in claim 7, wherein said measure of said chromatic dispersion comprises a time delay as a function of probe wavelength.

10. An apparatus as claimed in claim 7, including stepping means for stepping said tunable laser source across the reflection bandwidth of said grating.

11. An apparatus as claimed in claim 7, wherein said wavelength modulation is much less than said size of said respective step.

12. An apparatus as claimed in claim 7, including a Mach Zehnder interferometer for normalising the response of said interferometer.

13. An apparatus as claimed in claim 7, wherein said demodulation means employs a passive homodyne demodulation technique.

14. An interferometer for obtaining a measure of the chromatic dispersion of a fibre bragg grating, including an apparatus as claimed in claim 7.

* * * * *